United States Patent
Ha et al.

(10) Patent No.: US 7,613,285 B2
(45) Date of Patent: Nov. 3, 2009

(54) SYSTEM AND METHOD FOR SERVICE-ORIENTED AUTOMATIC REMOTE CONTROL, REMOTE SERVER, AND REMOTE CONTROL AGENT

(75) Inventors: Young-Guk Ha, Daejeon (KR); Joo-Chan Sohn, Daejeon (KR); Young-Jo Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 644 days.

(21) Appl. No.: 11/286,998

(22) Filed: Nov. 22, 2005

(65) Prior Publication Data
US 2006/0147001 A1    Jul. 6, 2006

(30) Foreign Application Priority Data
Dec. 7, 2004   (KR)   ............ 10-2004-0102476
Oct. 20, 2005  (KR)   ............ 10-2005-0099031

(51) Int. Cl.
*H04M 11/00*   (2006.01)
*G06F 15/16*   (2006.01)

(52) U.S. Cl. ............... 379/102.01; 379/102.02; 379/102.03

(58) Field of Classification Search ......... 379/102.01, 379/102.02, 102.03, 102.05; 709/202–203; 455/419, 420
See application file for complete search history.

(56) References Cited

U.S. PATENT DOCUMENTS 6,058,260 A * 5/2000 Brockel et al. ............. 703/4
2003/0171113 A1 * 9/2003 Choi ........................... 455/420

FOREIGN PATENT DOCUMENTS

EP   1233602 A1 * 8/2002
KR   10-2004-0091368   10/2004

* cited by examiner

*Primary Examiner*—Melur Ramakrishnaiah
(74) *Attorney, Agent, or Firm*—Blakely, Sokoloff, Taylor & Zafman LLP

(57) ABSTRACT

The present invention relates to a remote control system, a remote server, a remote control agent, and a remote control method.

According to the present invention, when controlling the remote apparatus to perform a target service, remote apparatus information and service information are searched and a service plan is generated based on the searched remote apparatus information and service information for execution of the target service.

In addition, a remote apparatus control process generated by the service plan and the process is performed. Therefore, users can easily control the remote apparatus and can be provided desired services.

30 Claims, 4 Drawing Sheets

SYSTEM AND METHOD FOR SERVICE-ORIENTED AUTOMATIC REMOTE CONTROL, REMOTE SERVER, AND REMOTE CONTROL AGENT

CROSS-REFERENCE TO RELATED APPLICATION

This application claims priority to and the benefit of Korean Patent Application No. 10-2005-0099031 filed in the Korean Intellectual Property Office on Oct. 20, 2005, the entire contents of which are incorporated herein by reference.

BACKGROUND OF THE INVENTION (a) Field of the Invention

The present invention relates to a remote control system, a remote control method, a remote server, and a remote control agent. More particularly, the present invention relates to a remote control system, a remote control method, a remote server, and a remote control agent for controlling a remote apparatus to perform a desired service.

(b) Description of the Related Art

Thanks to the development of computer networking technologies, various research and technical developments for an Internet-based remote control system have been achieved. Such technical developments are focused on remote control of network-connected apparatuses such as a mobile robot, digital home appliances, automatic moving objects, etc., by a user via the Internet. In addition, Internet-based technologies enable a user to access services anytime and anywhere in the world by controlling a network-connected apparatus, and they also have the potential of being utilized in various environments such as industry, education, entertainment, and security, etc.

As World Wide Web (WWW) technology is widely used, remote control systems employing WWW technology are now being developed. Such systems control a remote apparatus by utilizing a Common Gateway Interface (CGI) or Java technologies on the basis of a Hyper Text Transport Protocol (HTTP). For example, a remote excavation system called Mercury, developed for the first time by the University of Southern California, an indoor mobile robot called Xaiver, developed by the Carnegie Mellon University, and a web-based painting system called PumaPaint, developed by the Roger Williams University, are well-known systems.

The control instructions of such systems provide behavior-based control functions for the corresponding remote apparatus. For example, control instructions for a remote control robot arm controlled via web browsers may include "OPEN-GRIPPER," "GRASP," "LIFT-UP," "LIFT-DOWN," and "MOVE."

In more detail, as shown in FIG. 1, a user selects a control instruction and a control parameter according to an appropriate order while monitoring a robot arm 130 at a remote place through a web camera 140 based on a real-time feedback procedure 112, and transmits selected control instructions and parameters to a web server 110 performing a robot arm control procedure 111 through a user interface 101 on a web browser 100.

For example, the user checks what to move (an object), where to move it to (location), and the state of the robot arm 130, while monitoring the robot arm 130 at the remote place through the web camera 140, and sequentially performs following instructions for a "CLEAR-OBJECT" task. In general, one task is performed by sequentially processing the following instructions: "MOVE TO OBJECT," "LIFT-DOWN," "OPEN-GRIPPER," "GRASP," "LIFT-UP," "MOVE TO LOCATION", "LIFT-DOWN", "OPEN-GRIPPER," "LIFT-UP." However, this process is complex and an error may occur during the processes.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a service-oriented automatic remote control system.

In one aspect of the present invention, a remote control system for controlling a remote apparatus to perform a target service includes a remote control agent and a remote server. The remote control agent requests a service for the remote apparatus.

The remote server controls the remote apparatus based on information on the remote apparatus and the service in accordance with a service execution request of the remote control agent.

In another aspect of the present invention, a remote control method for controlling a remote apparatus to perform a target service includes a) searching remote apparatus information and service information to perform a target service, b) generating a service plan based on the searched remote apparatus information and service information, and c) generating a remote apparatus control process through the service plan and performing the process.

In another aspect of the present invention, there is provided a remote control method of a remote server connected to a remote control agent and controlling a remote apparatus according to a request of the remote control agent for execution of a target service. The remote control method includes a) searching remote apparatus information and service information to perform a target service, b) generating a service plan based on the searched remote apparatus information and service information, and c) generating a remote apparatus control process through the service plan and performing the process.

In another aspect of the present invention, there is provided a remote server connected to a remote control agent and controlling a remote apparatus according to a request from a remote control agent to perform a target service. The remote server includes a control knowledge storage unit for storing remote apparatus information and service information, and a device control agent for controlling the remote apparatus to perform a requested service based on the stored remote apparatus information and service information.

In another aspect of the present invention, there is provided a remote control agent for requesting a remote apparatus to perform a target service through a remote server. The remote control agent includes a process configuration module and a process execution module. The process configuration module generates a device control process through a service plan generated by the remote server based on remote apparatus information and service information, and the process execution module performs the device control process for the remote server to control the remote apparatus for execution of the target service.

DETAILED DESCRIPTION OF THE EMBODIMENTS

The present invention will now be described in more detail with reference to the accompanying drawings.

A remote control system of the present invention is a web-based remote control system using a semantic web language, Web Ontology Language (OWL) and OWL for services (OWL-S), according to an embodiment of the present invention, but it is not limited thereto. The scope of the present invention is based on contents of the specification, and language used herein is well known to a person of ordinary skill in the art and is appropriate for applicable network environments.

Figure 1:
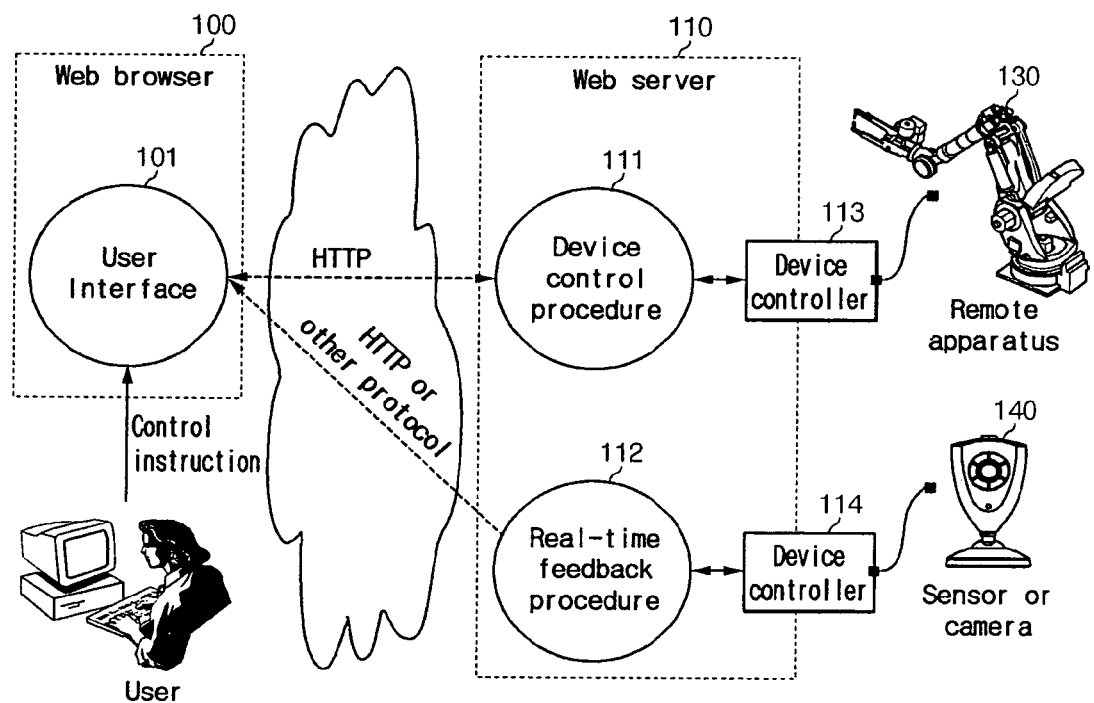
FIG. 1 is a schematic diagram of a conventional web-based remote control system.
Figure 2:
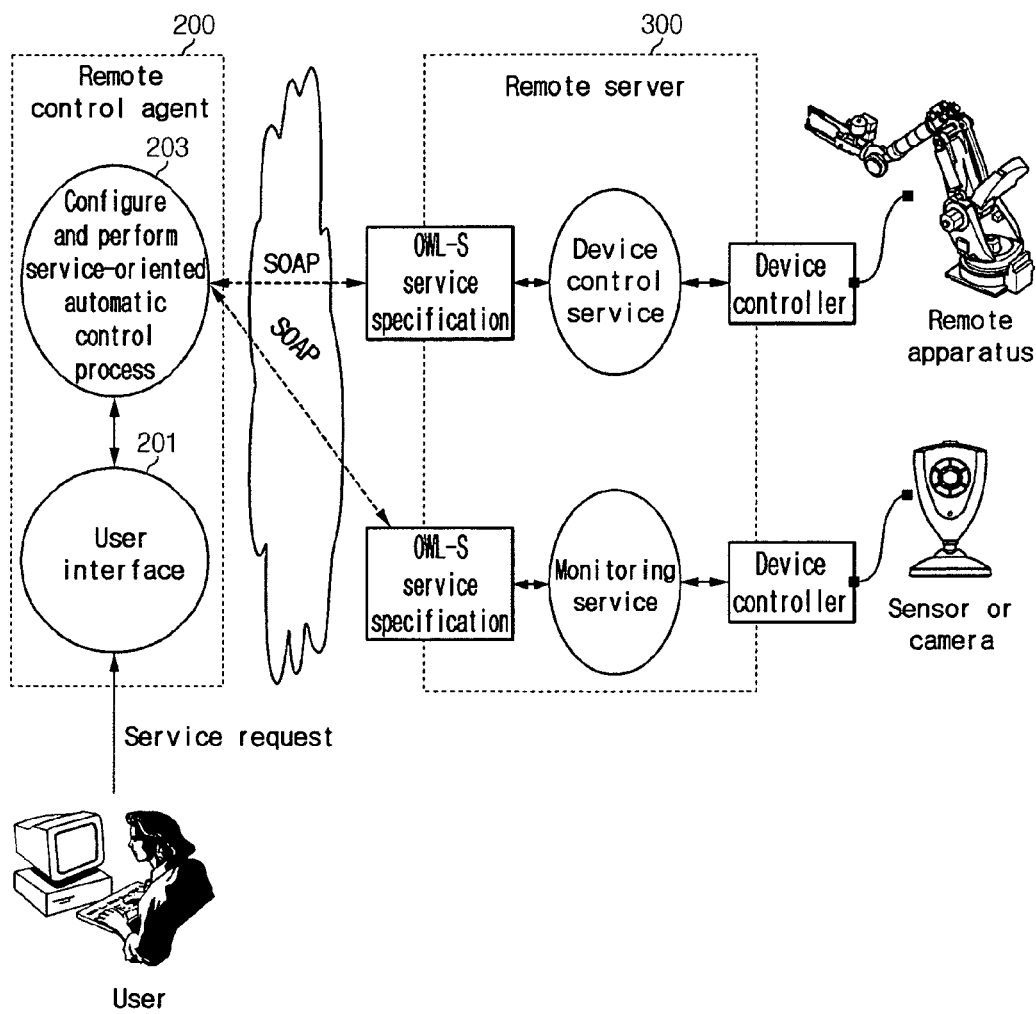
FIG. 2 is a schematic diagram of a remote control system according to an exemplary embodiment of the present invention.

As shown in FIG. 2, a remote control system according to an exemplary embodiment of the present invention includes a remote control agent 200 and a remote server 300.

For example, in the case that the remote control system is a web-based remote control system, functions of a web-based remote apparatus or a sensor to be controlled by the system and semantics of an interface may be described using a semantic web language such as Web Ontology Language (OWL) and OWL for Services (OWL-S) specification.

The OWL is designed to provide a language that can be used for applications that need to understand the content of information instead of just understanding the human-readable presentation of the content. The OWL facilitates greater machine readability of web contents by providing vocabulary along with formal semantics, and includes three sub-languages, OWL Lite, OWL, and OWL FULL, incorporating different features.

The OWL-S may include a service ontology for describing a web service, a service profile ontology for describing what the service does, a service model ontology for describing how the service works, and a service grounding ontology for describing how to access the service. A standard upper ontology is used for describing semantics of web services, and each web service is described using classes and properties defined by the upper ontology.

The service profile ontology schematically describes a web service structure, services capabilities, and service features, and defines service inputs, preconditions, service outputs, and effects.

Using the service profile ontology, functionality of a web service can be defined. In addition, the service model ontology defines process-flow, composition hierarchy and process definition, and defines service inputs, service outputs, preconditions, and effects of each process in detail. In addition, the service grounding ontology defines a communication protocol and a port number, and presents information for substantial performance of the web service, the information containing a data structure, a protocol, a physical address of service, etc. A software agent processes substantial operations of the web service and performs the web function by accessing the web service through the defined protocol.

When receiving a service request from a user through a user interface, the remote control agent 200 constructs a service-oriented automatic control process by deducing the request on the basis of OWL and OWL-S specifications and performs the process. At this time, the remote control agent 200 communicates with a device control service and a sensor monitoring service on the remote server 300 (a web server in this embodiment) through a simple object access protocol (SOAP) on the basis of the control process, and performs the requested service, wherein the SOAP is a web messaging protocol.

Figure 3:
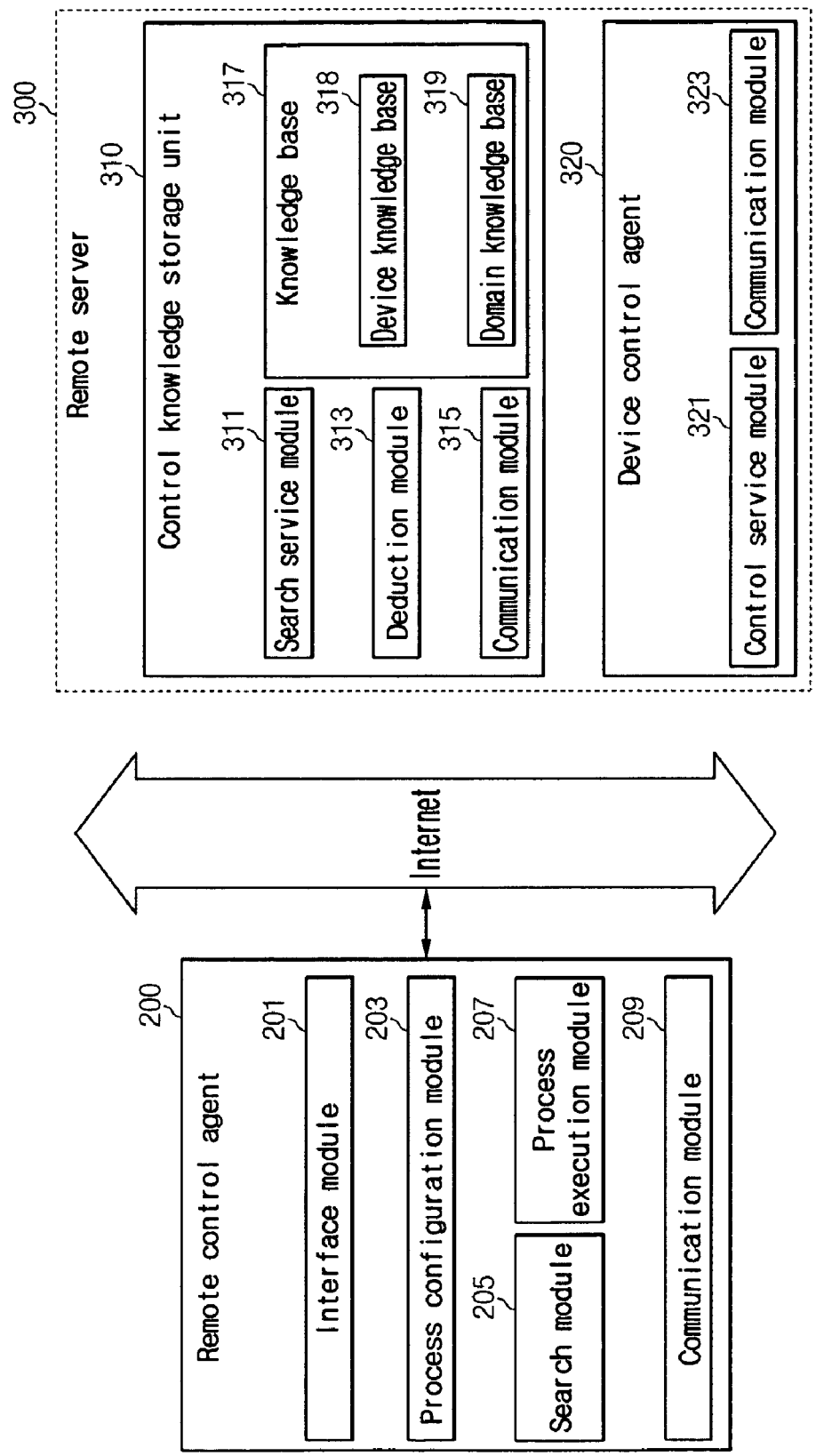
FIG. 3 is a detailed schematic diagram of the remote control system according to the exemplary embodiment of the present invention.

An exemplary embodiment will now be described in more detail with reference to FIG. 3.

The remote control system according to the exemplary embodiment of the present invention includes a remote control agent 200 and a remote server 300. The remote server 300 may include a control knowledge storage unit and a device control agent. The control knowledge storage unit and the device control agent may be separately provided in a plurality of servers according to their functions. In addition, constituent elements of the control knowledge storage unit and the device control agent are respectively interconnected through a network (e.g., Internet).

The remote control agent 200 may include an interface module 201, a search module 205, a process configuration module 203, a process execution module 207, and a communication module 209.

The communication module 209 includes a web service protocol stack, and it communicates with a remote process. The web service protocol stack has at least more than one of SOAP, extensible Markup Language (XML), and Hyper Text Markup Language (HTTP).

The interface module 201 provides an interface through which a user inputs a desired service task.

The search module 205 searches for knowledge that is necessary for achieving the service task input through the interface module 201 from a control knowledge storage unit 310 (to be described later).

The process configuration module 203 configures a device control process to achieve the service task requested by the user based on the knowledge searched by the search module 205. In addition, the process execution module 207 executes the device control process configured by the is process configuration module 203 while communicating with a device control agent 320 at a remote place through the communication module 209. The device control agent 320 will be described later.

The control knowledge storage unit 310 may include a search service module 311, a deduction module 313, a communication module 315, and a knowledge base 317.

The knowledge base 317 includes a domain knowledge base 319 and a device knowledge base 318. The domain knowledge base 319 stores domain knowledge described as a composite OWL-S process and data flow of the process for service task configuration, and the device knowledge base 318 stores device knowledge described as an atomic OWL-S process and a service grounding ontology, associated with functions and a control interface of a remote apparatus. The domain knowledge base 319 and device knowledge base 318 may be provided as one base, or may be separately included in the knowledge base 317.

The search service module 311 provides a semantic-based control knowledge search service for knowledge stored in the knowledge base 317 to the remote control agent 200 through the communication module 315 included in the control knowledge storage unit 310.

The deduction module 313 provides an OWL knowledge-based query processing function for the semantic-based search service.

The device control agent 320 includes a control service module 321 and a communication module 323. The control service module 321 implements a control function for the remote apparatus or sensor connected to the device control agent 320 and provides a control service to the remote control agent 200 through the communication module 323.

Figure 4:
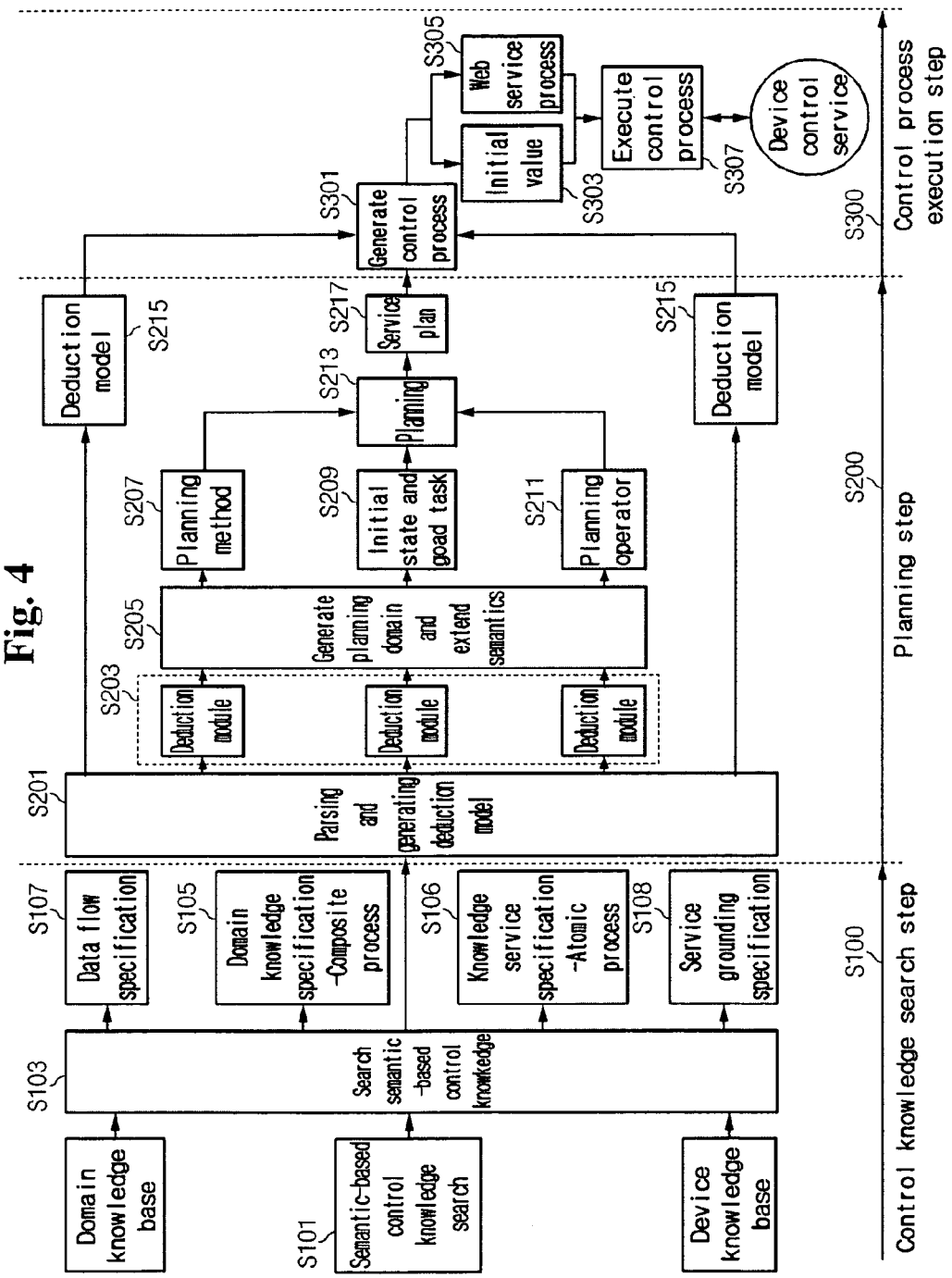
FIG. 4 is a flowchart of a remote control method according to an exemplary embodiment of the present invention.

FIG. 4 is a flowchart of a remote controlling method according to an exemplary embodiment of the present invention. As shown therein, the remote control process broadly includes a control knowledge search step S100, a planning step S200, and a control process execution step S300.

In the control knowledge search step S100, the domain knowledge base 319 and the device knowledge base 318 described in the OWL-S language stores the domain knowledge and the device knowledge as described above.

When a user requests a particular service through the interface module 201 included in the remote control agent 200 in step S101, a semantic-based control knowledge search process is executed in step S103. In more detail, the search module 205 of the remote control agent 200 searches for a domain knowledge specification, a composite process and device service specification, an atomic process, a data flow specification, and a service grounding specification for configuration of each control process through steps S105 to S108. The search service module 311 of the control knowledge storage unit 310 provides a semantic-based search service for the corresponding knowledge stored in the knowledge base 317 to the remote control agent 200 through the communication module 315.

An example of a request for home security remote monitoring service and domain knowledge and device service specifications of the corresponding service are described in the OWL as follows. In the example, the home security remote monitoring service is described as a process in which a camera-mounted mobile robot moves to a predefined location in a house, takes a picture of the location, and transmits the picture to a user outside the house.

```
<exemplary embodiment of home security remote monitoring service
request>
    <req:ServiceReq>
        <profile:hasEffect rdf:resource="#HomeSecurityCheck" />
    </req:ServiceReq>
<exemplary embodiment of a home security monitoring service domain
knowledge specification searched from the domain knowledge base based on
semantics according to the service request>
        <process:CompsiteProcess rdf:ID="ReportHomeStatus">
            <process:hasUnConditionalEffect rdf:resource="#HomeSecurityCheck"/>
            <process:composedOf>
                <process:Sequence>
                    <process:components rdf:parseType="collection">
                        <process:AtomicProcess rdf:ID="MoveTo">
                            <process:hasInput rdf:resource="#Destination"/>
                            <process:hasUnConditionalEffect rdf:resource="#AtDestination"/>
                        </process:AtomicProcess>
                        <process:AtomicProcess rdf:ID="GetImage">
                            <process:hasUnConditionalOutput rdf:resource="#CapturedImage"/>
                        </process:AtomicProcess>
                        <process:AtomicProcess rdf:ID="SendImage"/>
                            <process:hasInput rdf:resource="#ImageToBeSent"/>
                            <process:hasUnConditionalEffect rdf:resource="#ImageSent"/>
                        </process:AtomicProcess>
                    </process:components>
                </process:Sequence>
            </process:composedOf>
        </process:CompositeProcess>
    <data flow from CaptureImage to ImageToBeSent in the composite
process "ReportHomeStatus" on the domain knowledge specification>
        <process:sameValues rdf:parseType="Collection">
            <process:ValueOf process:atProcess="#ReportHomeStatus" process:theParameter="#CapturedImage" />
            <process:ValueOf process:atProcess="#ReportHomeStatus" process:theParameter="#ImageToBeSent" />
        </process:sameValues>
    <exemplary embodiment of a robot driving device service specification
searched from the device knowledge base for an atomic service "MoveTo" on
the domain knowledge specification>
        <profile:Profile rdf:ID="RobotMoveToService">
            <profile:has__process rdf:resource="#RobotMoveToProcessModel" />
            <profile:hasInput rdf:resource="#Destination"/>
            <profile:hasEffect rdf:resource="#AtDestination"/>
        </profile:Profile>
    <service grounding ontology for a service "RobotMoveToService" on the
device service specification>
        <grounding:WsdlGrounding rdf:ID="RobotMoveToServiceGrounding">
            <service:supportedBy rdf:resource="#RobotMoveToService"/>
            <grounding:hasAtomicProcessGrounding>
                <grounding:WsdlAtomicProcessGrounding rdf:ID="RobotMoveToGrnd">
                <grounding:owlsProcess rdf:resource="#RobotMoveToServiceProcess"/>
                <grounding:wsdlDocument>
                    http://robot.etri.re.kr:8080/axis/RoboMoveToService?wsdl
    <web service definition file containing information for performing
"RobotMoveToService" on the service grounding ontology>
                </grounding:wsdlDocument>
```

```
            <grounding:wsdlOperation>
                <grounding:WsdlOperationRef>
                    <grounding:portType>RobotMoveToService</grounding:portType>
                    <grounding:operation>moveTo</grounding:operation>
                </grounding:WsdlOperationRef>
            </grounding:wsdlOperation>
        </grounding:WsdlAtomicProcessGrounding>
    </grounding:hasAtomicProcessGrounding>
</grounding:WsdlGrounding>
```

When the above described control knowledge search step S100 is finished, the planning step S200 is executed. The planning step S200 includes parsing and generating a deduction model process, a planning domain generation/semantic extension process, and a planning process.

The deduction module 313 of the control knowledge storage unit 310 receives the domain knowledge and device service specifications searched in the control knowledge step, respectively parses them, and generates a deducible object model in steps S210 and S203. In this embodiment, the deduction module 313 may generate an executable Java object using a Java library when parsing the domain knowledge specification and the device service knowledge specification described in the OWL, and generating the deducible OWL object model.

The deduction module 313 generates a planning domain and extends semantics. For example, processes described in the OWL should be converted into planning operators and methods for hierarchical task network (HTN) planning during a domain generating process. At this time, a planning method, a planning operator, an initial state, and a target task may be generated by using a parsed deduction model as an input in order to perform a substantial artificial intelligence (AI) planning algorithm in steps S205, S207, S209, and S211.

The HTN planning is a hierarchical task model-based AI planning method that creates plans by task decomposition. A main concept of a HTN-based service is composing tasks into smaller and smaller subtasks, until primitive tasks that can be performed directly are found. Thus, the HTN planning is performed by tasks, each having a hierarchial structure called an operator and a method. Each operator, which is a primitive task which can be performed directly, is mapped on the atomic OWL-S process. Each method corresponds to tasks that can be recursively decomposed until each step is reduced to an operator, and is mapped on the composite OWL-S process. In order words, the method sets a hierarchical structure of tasks in the HTN planning, and the hierarchical structure is similar to the hierarchical structure of the OWL-S.

The planning domain is created by generating a planning method and a planning operator according to a domain extension algorithm. In addition, semantic extension based on deduction of a subsumption relationship between the parsed object models of the domain knowledge specification and the device service specification would make the creation of planning domain more flexible in step S213.

The following is an example of a planning domain creation and semantic extension algorithm for the HTN planning.

<Exemplary Embodiment of a Planning Domain Creation and Semantic Extension Algorithm for the HTN Planning>

Definition 1 (Subsumption)

a subsumes b ($a \supseteq b$) if and only if rdf:type(a, owl:Class) $\wedge$ rdf:type(b, owl:Class) $\wedge$ (rdfs:subClassOf(b, a) $\vee$ owl:equivalentClass(a, b))

Definition 2 (Subsumption on a property)

x subsumes y on p ($a \supseteq b | p$) if and only if for each $a \in \{v | p(x,v)\}$, there exists distinct $b \in \{v | p(y,v)\}$ s,t, $a \supseteq b$ Definition 3 (Compatibility)

x is compatible with y (x~y) if and only if rdf:type(x, process:Process)

$\wedge$ rdf:type(y, process:Process) $\wedge$
(x $\supseteq$ y | process : hasInput) $\wedge$ (x $\supseteq$ y | process : has Precondition) $\wedge$
(y $\supseteq$ x | process : hasOuput) $\wedge$ (y $\supseteq$ x | process : hasEffect)

Extend_Task_Domain_Knowledge(S,K)

Input:

A set of device service specifications S as OWL-S process models

A set of task domain knowledge K as OWL-S process models

Output:

A set of extended task domain knowledge K'

1) Set K'=K

2) For each task domain knowledge specification $K_I'$ in K':

C=a composite process of $K_I'$

For each atomic process T in C:

//repeat on all Atomic process T included in C

If there is $S_j$ in $S_{s.t.} S_j \equiv T$, continue

//continue if Device service exactly corresponding to T is found else if there exists $S_j$ in $S_{s.t.} S_j \sim T$, replace T with $S_j$ //otherwise, replace with a similar service satisfying Definition 3

3) Return K'

That is, when creating the planning domain based on the deduction of subsumption relation between the OWL object models of the parsed domain knowledge specification and the device service specification, assume that S denotes the device service specification of the OWL-S process model, K denotes the domain knowledge specification of the OWL-S process model, K' denotes the extended domain knowledge obtained through the extension algorithm, C denotes a composite process of K', and T denotes atomic processes included in C. Based on this assumption, the corresponding device service is provided to T when a device service exactly corresponding to T exists in S, and otherwise, the semantics of the planning domain is extended by replacing T with a similar service.

The following is an example of a planning domain generation algorithm for the HTN planning.

<Exemplary Embodiment of a Planning Domain Generation Algorithm for the HTN Planning>

---

Definition 1 (Negative Effect)
<owl:Class rdf:ID="NegativeEffect">
<owl:subClassOf rdf:resource="&pocess;#Effect">
</owl:Class>
<owl:SymmetricProperty rdg:ID="negates">
<rdfs:domain rdf:resource="#NegativeEffect">
<rdfs:range rdf:resource="&process;#Effect">
</owl:SymmetricProperty>

---

Generate_Planning_Domain(S,K)
Input:
A set of device service specifications S as OWL-S process models
A set of task domain knowledge K as OWL-S process models
Output:
A SHOP2 domain D
1) Set D=0
2) For each device service specification Q in S:
//generate a planning operator
If Q has only outputs, set O=Translate_Sensing_Service (Q)
//if the service has only an output, the service is regarded as a sensing service.
Else if Q has only effects, set O=Translate_Action_Service (Q)
//If the service has only effects, the service is regarded as a service performing a specific action
Add O to D
3) For each task domain knowledge specification Q in K:
//generate a planning method
B=control construct of C as defined in Q
If B=Sequence, set M=Translate_Sequence_Construct (Q)
//if a service process is a sequence of atomic services
else of B=Choice, set M=Translate_Choice_Construct (Q)
//if a service process is parallel atomic services
// . . . For the sake of brevity, procedures for the rest of constructs are omitted
Add M to D
4) Return D A detailed exemplary embodiment of the planning operator and planning method generation algorithm will now be described.

<Exemplary Embodiment of the HTN Planning Operator Generation Algorithm for the Device Service Specification>

Translate_Sensing_Service(Q)
Input: A device service description Q of an atomic process A with only outputs
Output: A SHOP2 operator O
1) I=the set of input parameters $\{I_1, \ldots, I_n\}$ defined for A as in Q
2) i=the set of output parameters $\{U_1, \ldots, U_m\}$ defined for A as in Q
3) P=the set of preconditions $\{P_1 \ldots, P_l\}$ defined for A as in Q
4) Set Pre=(Pre$_P$^Pre$_R$) where conjunct of all the physical preconditions Pre$_P$=$\hat{}_{i=1,1}(P_i)$
and conjunct of all the referential preconditions Pre$_R$=$\hat{}_{i=1,n}$ (known $I_i$)
5) Set Add=the set of all referential effects ((known $U_l$) . . . (knonvn $U_m$)) of A
6) Set Del=ø
7) Return O=(A(I) Pre Del Add)

Translate_Action-Service(Q)
Input:
A device service description Q of an atomic process A with only effects
Output:
A SHOP2 operator O
1) I=the set of input parameters $\{I_1, \ldots, I_n\}$ defined for A as in S
2) P=the set of preconditions $\{P_1, \ldots, P_l\}$ defined for A as in S
3) E=Ep∪En where the set of positive effects Ep=$\{Ep_l, \ldots, Ep_m\}$ defined for A as in S and the set of negative effects En=$\{En_l, \ldots, En_o\}$ defined for A as in S
4) Set Pre=(Pre$_P$^Pre$_R$) where conjunct of all the physical preconditions Pre$_P$=$\hat{}_{i=1,1}(P_i)$
and conjunct of all the referential preconditions Pre$_R$=$\hat{}_{i=1,n}$ (known $I_i$)
5) Set Add=(EL$_l$, . . . , Ep$_m$)
6) Set Del=(the effect that En$_l$ negates . . . the effect that En$_o$ negates)
7) Return O=(A(I) Pre Del Add)

<Exemplary Embodiment of the HTN Planning Operator Generation Algorithm for Domain Knowledge Specification>

Translate_Sequence_Construct(Q)
Input:
An operation knowledge description Q of a composite process C
Output:
A SHOP2 method M
1) I=the set of input parameters $\{I_l, \ldots, I_n\}$ defined for C as in Q
2) P=the set of precondition $\{P_1, \ldots, P_l\}$ defined for C as in Q
3) Set Pre=(Pre$_P$^Pre$_K$) where conjunct of all the physical preconditions Pre$_P$=$\hat{}_{i=1,1}(P_i)$
and conjunct of all the knowledge preconditions Pre$_K$=$\hat{}_{i=1,n}$ (known $I_i$)
4) Set 7=the sequence of component processes (b$_l$ . . . b$_m$) of the construct as in Q
5) Return M=(C(I) Pre T)

That is, a planning operator is generated by translating a service with outputs only into a sensing service and a service with effects only into a service for performing a particular action, and a planning method is generated service processes for execution of a sequence of atomic services and for execution of parallel stomic services, such that a planning domain is generated.

In the planning step, the deduction module may generate a service plan by performing an appropriate AI planning algorithm (e.g., HTN planning algorithm) using the planning method and planning operator, the initial value, and the target task as inputs in step S217.

The control process execution step S300 broadly includes a control process generation process and a control process execution process.

In the control processor generation process, the process configuration module of the remote control agent uses the service plan generated during the planning process as an input and generates a web service process that can be directly performed through a web protocol. To generate a performable web service process, the service plan and the data flow and service grounding specifications searched through the domain knowledge base and the device knowledge base in the control knowledge search step are required. In addition, the data flow and the service grounding specifications are respectively reflected on the OWL deduction model generated from the parsing and generating of the deduction model process, and thus, the data flow and service grounding information are obtained from the OWL deduction model in the substantial control process generation process, in steps S205, S301, and S305.

In the control process execution process, the process execution model of the remote control agent performs the control process using an initial value generated from information input by the user when requesting a service while communicating with the device control service using the SOAP in steps S303 and S307.

The scope of the present invention is not limited to the web-based is technologies, and can be applied to technologies under various network environments. The scope of the present invention is intended to cover various modifications and equivalent technical constituent elements within the spirit and scope of the appended claims.

As described, the conventional web-based remote control system is expected to provide behavior-based remote control of an apparatus via Internet through an HTTP- or HTMP-based user interface to a user. In more detail, the user monitors the remote apparatus using the web-camera or sensor and selects an appropriate device control instruction and manually controls the remote apparatus through a web browser to perform a user-wanted task in the existing web-based remote control system.

However, according to the embodiment of the present invention, the semantic network technologies and artificial intelligence planning algorithms provides automatic service-oriented remote control instead of erroneous manual remote control. Therefore, the user can remotely control apparatuses, such as a mobile robot, digital home appliances, and an unmanned moving object while being connected to the Internet, and can be provided with services anytime and anywhere according to the embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A remote control system for controlling a remote apparatus to perform a target service, the remote control system comprising:
    a remote control agent for requesting a service for the remote apparatus; and
    a remote server for controlling the remote apparatus based on information on the remote apparatus and the service in accordance with a service execution request of the remote control agent, the remote server including a control knowledge storage including:
        a knowledge base for storing the remote apparatus information and the service information as device knowledge and domain knowledge, respectively;
        a search service module for searching for information associated with a request of the remote control agent from the knowledge base; and
        a deduction module for performing planning for a target service on the basis of the device knowledge and domain knowledge transmitted from the search service module.

2. The remote control system of claim 1, wherein the remote apparatus information comprises information on at least one of a remote apparatus function, a remote apparatus control interface, and an atomic process directly performed by the remote apparatus.

3. The remote control system of claim 1, wherein the service information comprises information on at least one of a composite process formed of a plurality of atomic processes and a data flow of the process, the composite process and the data flow being domain knowledge for service task configuration, and the plurality of atomic processes directly performed by the remote apparatus.

4. The remote control system of claim 1, wherein the remote server comprises:
    a device control agent for performing a request service by controlling the remote apparatus on the basis of the remote apparatus information and the service information.

5. The remote control system of claim 1, wherein the deduction module generates a deduction model for the target service using the device knowledge and the domain knowledge, generates a planning domain from the deduction model, sets a target task, and generates a service plan.

6. The remote control system of claim 5, wherein the deduction module generates the service plan using a planning method (tasks than can be recursively decomposed into subtasks), a planning operator (a primitive task that can be directly performed), an initial state, and the target task by employing an artificial intelligence planning algorithm, the planning method, the planning operator, the initial state, and the target task being generated from a planning domain generation and semantic extension process from the deduction model.

7. The remote control system of claim 6, wherein the artificial intelligence planning algorithm is a hierarchical task network (HTN) planning algorithm.

8. The remote control system of claim 1, wherein the knowledge base comprises a device knowledge base for storing the device knowledge and a domain knowledge base for storing the domain knowledge.

9. The remote control system of claim 1, wherein the device control agent comprises a control service module for controlling a connected remote apparatus according to a device control process generated for execution of a target service.

10. The remote control system of claim 1, wherein the remote control agent comprises:
    a process configuration module for generating a device control process for the remote apparatus through the service plan generated by the remote server for execution of the target service; and
    a process execution module for performing the device control process for the remote server to control the remote apparatus for execution of the target service.

11. A remote server connected to a remote control agent, and for controlling a remote apparatus according to a request from a remote control agent to perform a target service, the remote server comprising:
    a control knowledge storage unit for storing remote apparatus information and service information; and
    a device control agent for controlling the remote apparatus to perform a requested service based on the stored remote apparatus information and service information,
    wherein the control knowledge storage unit includes:
        a knowledge base for storing the remote apparatus information and the service information as device knowledge and domain knowledge, respectively;

a search service module for searching information associate with a request of the remote control agent from the knowledge base; and a deduction module for performing planning for a target service on the basis of device knowledge and domain knowledge transmitted from the search service module.

12. The remote server of claim 11, wherein the remote apparatus information includes information on at least one of functions of the remote apparatus, a remote apparatus control interface, and an atomic process directly performed by the remote apparatus.

13. The remote server of claim 11, wherein the service information contains information on at least one of a composite process formed of a plurality of atomic processes and a data flow of the process, the composite process and data flow being domain knowledge for service task configuration, and the plurality of atomic processes directly performed by the remote apparatus.

14. The remote server of claim 11, wherein the deduction module generates a deduction model for the target service using the device knowledge and the domain knowledge, generates a planning domain from the deduction model, sets a target task, and generates a service plan.

15. The remote server of claim 14, wherein the deduction module generates the service plan using a planning method (tasks than can be recursively decomposed into subtasks), a planning operator (a primitive task that can be directly performed), an initial state, and the target task by employing an artificial intelligence planning algorithm, the planning method, the planning operator, the initial state, and the target task being generated from a planning domain generation and semantic extension process from the deduction model.

16. The remote server of claim 15, wherein the artificial intelligence planning algorithm is a hierarchical task network planning (HTN) algorithm.

17. The remote server of claim 11, wherein the knowledge base comprises a device knowledge base for storing the device knowledge and a domain knowledge base for storing the domain knowledge.

18. The remote server of claim 11, wherein the device control agent comprises a control service module for controlling a connected remote apparatus according to a device control process generated for execution of a target service.

19. A remote control method for controlling a remote apparatus to perform a target service, the remote control method comprising:
a-1) storing remote apparatus information and service information as device knowledge and domain knowledge, respectively;
a-2) searching the remote apparatus information and the service information to perform a target service;
b-1) receiving device knowledge and domain knowledge corresponding to the target service;
b-2) generating a deduction model using the device knowledge and the domain knowledge, generating a planning domain from the deduction model, setting a target task, and generating a service plan; and
c) generating a remote apparatus control process through the service plan and performing the process.

20. The remote control method of claim 19, wherein the remote apparatus information comprises information on at least one of a remote apparatus control interface and an atomic process directly performed by the remote apparatus.

21. The remote control method of claim 19, wherein the service information comprises information on at least one of a composite process formed of a plurality of atomic processes and a data flow of the process, the composite process and the data flow being domain knowledge for service task configuration and the plurality of atomic processes directly performed by the remote apparatus.

22. The remote control method of claim 19, wherein, in b-2), the service plan is generated using a planning method (tasks that can be recursively decomposed into subtasks), a planning operator (a primitive task that can be directly performed), an initial state, and the target task as inputs by employing an artificial intelligence planning algorithm, the planning method, the planning operator, the initial state, and the target task being generated from a planning domain generation and semantic extension process from the deduction model.

23. The remote control method of claim 22, wherein the artificial intelligence planning algorithm is a hierarchical task network (HTN) planning algorithm.

24. The remote control method of claim 19, wherein c) comprises:
c-1) generating a device control process of the remote apparatus for the execution of the target service based on the service plan; and
c-2) performing the device control process to control the remote apparatus for execution of the target service.

25. A remote control method of a remote server connected to a remote control agent and controlling a remote apparatus according to a request of a remote control agent for execution of a target service, the remote control method comprising:
a-1) storing remote apparatus information and service information as device knowledge and domain knowledge, respectively;
a-2) searching the remote apparatus information and the service information for execution of a target service;
b-1) receiving device knowledge and domain knowledge corresponding to the target service;
b-2) generating a deduction model using the device knowledge and domain knowledge as an input, generating a planning domain from the deduction model, setting a target task, and generating a service plan; and
c) generating a remote apparatus control process through the service plan and performing the process.

26. The remote control method of claim 25, wherein the remote apparatus information comprises information on at least one of a remote apparatus control interface and an atomic process directly performed by the remote apparatus.

27. The remote control method of claim 25, wherein the service information comprises information on at least one of a composite process formed of a plurality of atomic processes and a data flow of the process, the composite process and the data flow being domain knowledge for service task configuration and the plurality of atomic processes directly performed by the remote apparatus.

28. The remote control method of claim 25, wherein, in b-2), the service plan is generated using a planning method (tasks than can be recursively decomposed into subtasks), a planning operator (a primitive task that can be directly performed), an initial state, and the target task as inputs by employing an artificial intelligence planning algorithm, the planning method, the planning operator, the initial state, and the target task being generated from a planning domain generation and semantic extension process from the deduction model.

29. The remote control method of claim 28, wherein the artificial intelligence planning algorithm is a hierarchical task network (HTN) planning algorithm.

30. The remote control method of claim 25, wherein, in c), the target service is performed by controlling the remote apparatus connected through a network according to the remote apparatus control process generated by the remote control agent.

* * * * *